(12) United States Patent
Kershaw et al.

(10) Patent No.: US 7,565,620 B1
(45) Date of Patent: Jul. 21, 2009

(54) SYSTEM AND METHOD FOR COMPARING ATTRIBUTES OF DOCUMENTS

(75) Inventors: Christopher Kershaw, Oakland, CA (US); Darin Rock, San Francisco, CA (US); Terri Wolf, Oakland, CA (US)

(73) Assignee: Charles Schwab & Co., San Francisco, CA (US)

( * ) Notice: Subject to any disclaimer, the term of this patent is extended or adjusted under 35 U.S.C. 154(b) by 508 days.

(21) Appl. No.: 09/598,889

(22) Filed: Jun. 21, 2000

(51) Int. Cl.
G06F 3/048 (2006.01)
(52) U.S. Cl. ...................... 715/803; 715/781
(58) Field of Classification Search ............... 345/764, 345/339, 853, 734, 854; 715/511, 530, 526, 715/210, 778, 781, 785, 803, 821; 348/150; 709/203
See application file for complete search history.

(56) References Cited

U.S. PATENT DOCUMENTS

| | | | | |
|---|---|---|---|---|
| 5,751,829 A | * | 5/1998 | Ringland et al. ............ 382/100 |
| 5,870,559 A | * | 2/1999 | Leshem et al. .............. 345/854 |
| 6,026,397 A | * | 2/2000 | Sheppard .................... 707/5 |
| 6,067,525 A | * | 5/2000 | Johnson et al. .............. 705/10 |
| 6,226,655 B1 | * | 5/2001 | Borman et al. .............. 345/764 |
| 6,658,626 B1 | * | 12/2003 | Aiken ........................ 715/526 |

\* cited by examiner

Primary Examiner—Weilun Lo
Assistant Examiner—Truc T Chuong
(74) Attorney, Agent, or Firm—DLA Piper LLP (US)

(57) ABSTRACT

A system and method for comparing information from different sources in which anchor links identifying categories of information are embedded within reports on a plurality of items to be compared, and in which a plurality of dynamic frames are provided in a visual display, each frame displaying the portion of a report for a different one of the plurality of items to be compared, which portion corresponds to a designated common anchor link.

1 Claim, 7 Drawing Sheets

FIG. 5C

SYSTEM AND METHOD FOR COMPARING ATTRIBUTES OF DOCUMENTS

TECHNICAL FIELD

The present invention is directed generally to a system and method for comparing attributes of documents, and more particularly to a system and method using a browser to retrieve and compare categories of information for different items being compared.

BACKGROUND OF THE INVENTION

Presently, when brokerage company customer representatives seek to advise customers about investments using present systems and methods, it is often difficult for them to respond to customer questions about the relative characteristics of different mutual funds, for example. At present, in order to compare and contrast many of the important details of mutual funds, it is necessary to switch back and forth between multiple web pages to review relevant information for different funds.

In the prior art, such as that available on "schwab.com," the website of the assignee of the subject application, a user can compare up to five (5) funds at a time, however, only summary information is available for such comparison. To access a full report on a fund, the user needs to click on the fund name, which brings up the fund report. However, to view the report for another fund, the user needs to click on that fund's name, which brings up that other fund's report in place of the previous report. Alternatively, the user can toggle between windows, each of which has the website on a browser, but pointed at the reports of different funds.

As can be appreciated, these prior methods for comparing information are cumbersome and time consuming to use.

SUMMARY OF THE INVENTION

The above and other problems and disadvantages of prior systems and methods are overcome by the present invention of a system and method for comparing information from different sources in which anchor links identifying categories of information are embedded within reports on a plurality of items to be compared, and in which a plurality of dynamic frames are provided in a visual display, each frame displaying the portion of a report for a different one of the plurality of items to be compared, which portion corresponds to a designated common anchor link.

In one embodiment of the present invention, a client terminal displays a navigational frame which interacts with the plurality of dynamic frames and with a server. Identification of the items to be compared is received through the navigational frame, and the client terminal communicates with the server to cause the server to provide reports on the identified items. These reports include embedded anchor links which identify, and are placed at the location of, categories of information contained in the reports. Also received through the navigational frame is the designation of an anchor link selected by the user for viewing. Upon receipt by the client terminal of the reports from the server, the portion of each report corresponding to the designated anchor link are displayed in the plurality of dynamic frames, each one of the plurality of dynamic frames displaying the information for a different one of the reports.

The use of dynamic frames and anchor links embedded within the information permits a simultaneous comparison, on a single screen, of common categories of information about a plurality of different items, such as different mutual funds. Not only is the comparison simultaneous, but the user is also able to navigate to other common categories of information about the different items simply by clicking on the desired category in the navigational frame. The display provided in dynamic frames is then shifted to the location of the designated anchor link in each of the reports being display. In this manner, a simple, quick and efficient method and system for comparing information about different items is provided.

These and other features and advantages of the present invention will be more readily understood upon consideration of the following detailed description and accompanying drawings.

BRIEF DESCRIPTION OF THE DRAWINGS

FIGS. 5A, 5B and 5C are screen shots showing an illustrative example of the operation of the present invention.

DETAILED DESCRIPTION OF THE INVENTION

Figure 1:
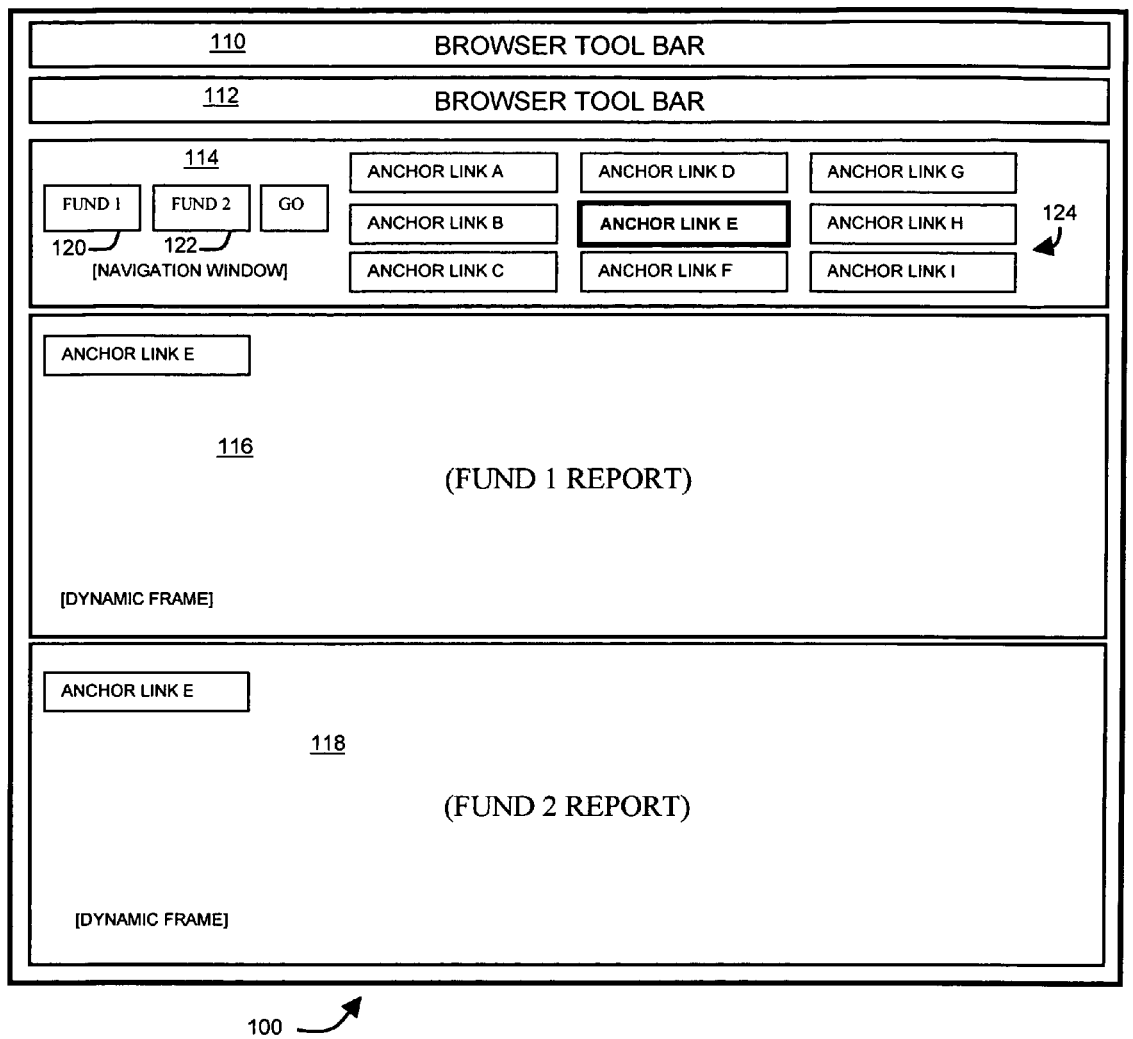
FIG. 1 illustrates the navigational frame and the dynamic frames of a two-fund comparison embodiment of the present invention.

Referring to FIG. 1, a typical browser window is shown incorporating an embodiment of the present invention is illustrated. Below the browser tools bars 110 and 112, are positioned a navigation frame 114, and two dynamic frames 116 and 118. While these frames are shown stacked with respected to one another, it is to be understood that other layouts are possible in the spirit of the present invention.

On the left side of navigational frame 114 are two input slots 120 and 122 through which the user identifies the items, in this example Funds or Stocks, to be compared. The GO button initiates the information retrieval process through which reports for the designated funds are requested from a server and returned for display in the dynamic frames 116 and 118.

The particular portion of a report displayed in a dynamic frame is designated by the particular anchor link selected by the user in the anchor link section 124 of navigational frame 114. As illustrated in the example of FIG. 1, in heavier lines, Anchor Link E has been selected by the user. In turn, the portion of the Fund 1 Report associated with anchor link E is shown displayed in dynamic frame 116, while the portion of the Fund 2 Report associated with anchor link E is shown displayed in dynamic frame 118. For example, anchor link E may be associated with the portions of each report which cover After Tax Returns for the particular mutual funds. Thus, the user can compare, for the two designated mutual funds their After Tax Return information, all in one view, and without having to toggle or flip back and forth between windows.

By clicking on a different anchor link in navigational frame 114, for example on Anchor Link I, which may be assigned to Fees/Expenses for the funds, the user will be provided with the Fees/Expenses portion of the report for Fund 1 in dynamic frame 116, and the Fees/Expenses portion of the report for Fund 2 in dynamic frame 118. Although not shown in FIG. 1, it is to be understood that a scroll bar can be provided in each of the dynamic frames 116 and 118, through which the user can move around within the report being displayed for the particular fund in the frame.

It is to be understood that, although the examples provided in this description involve funds, mutual funds, stocks, etc., other items about which information is available in electronic form can be the subject of the present invention methodology and system. For example fact sheets on deals offered on an automobile model by two different automobile dealerships can be easily and efficiently compared using the present invention. The only requirement is that the various reports have sections on common subjects, and are modified to include the appropriate anchor link for each section.

Figure 2:
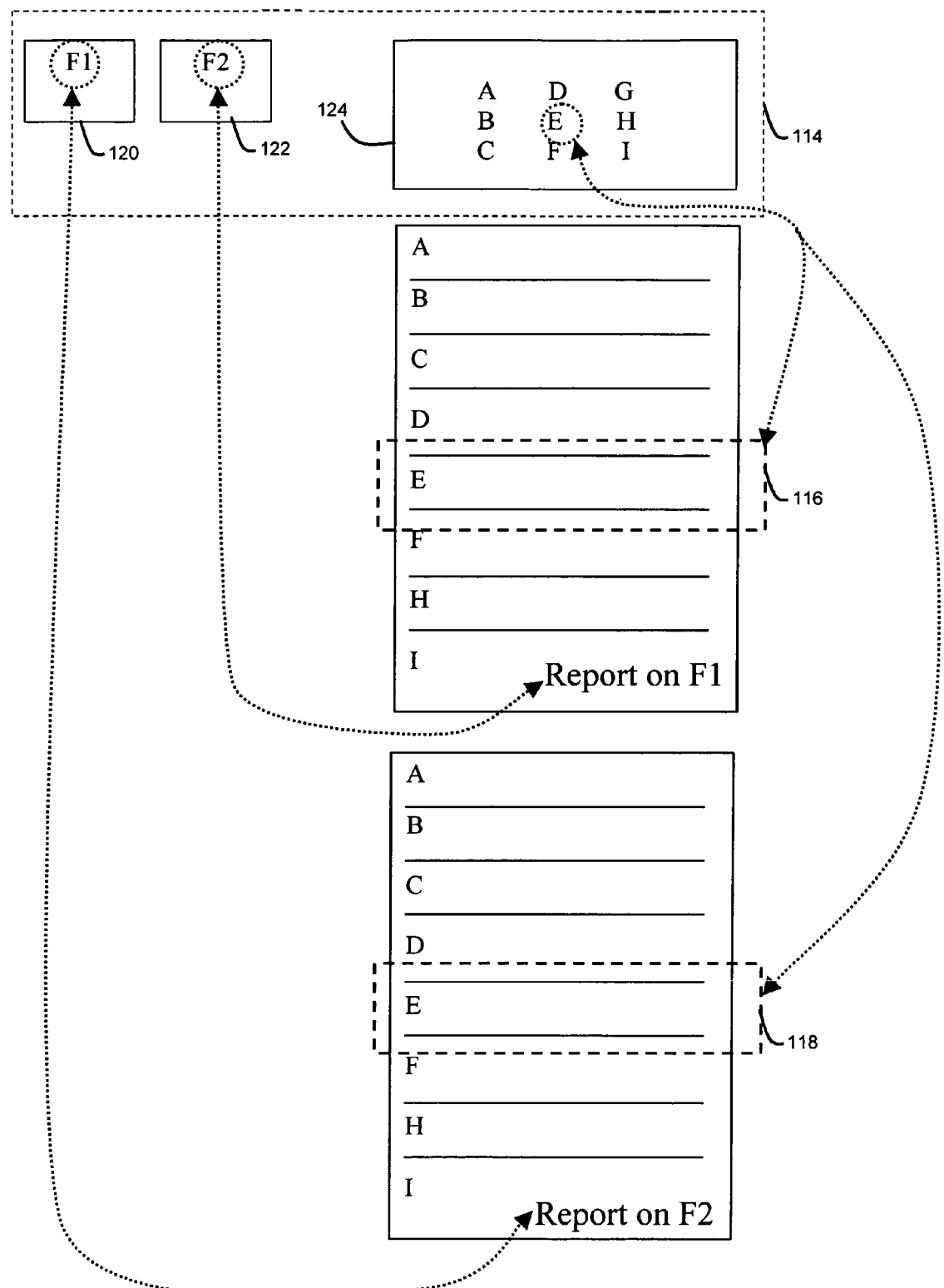
FIG. 2 illustrates the relationship between the items and anchor links designated in the navigational frame and the anchor links embedded in the reports on the designated items, and the portions of the reports which are displayed in the dynamic frames, in accordance with the present invention.
Figure 3:
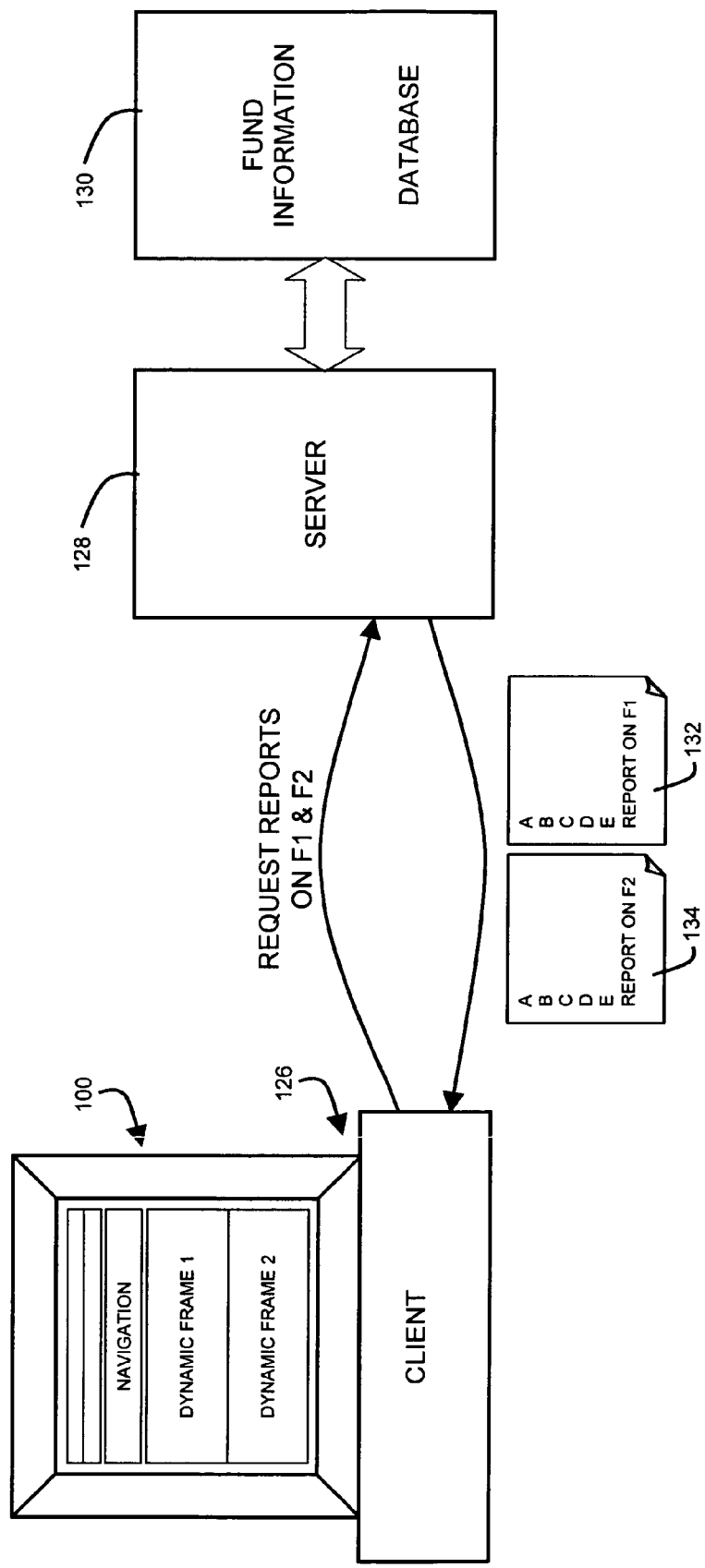
FIG. 3 illustrates the interaction between a client terminal, on which the navigational frame and dynamic frames are displayed, and a server and database in which information about items are located and assembled into reports.

Referring to FIGS. 2 and 3, the above arrangement will now be described in greater detail. As described earlier, the items designated in slots 120 and 122 of navigational frame 114 result in reports for those items being obtained for displaying in the dynamic frames 116 and 118. However, it is the anchor link section 124 of navigational frame 114 through which the user designates the desired section of each report to be displayed for comparison purposes in dynamic frames 116 and 118. This is illustrated by the dashed lines depicting dynamic frames 116 and 118 being positioned over the portion of each of the report which correspond to anchor link E in FIG. 2.

FIG. 3 shows the client terminal 126 which displays the navigational and dynamic frames, and the resulting comparison 100 provided by the present invention. When the GO button is clicked in FIG. 1, the client terminal 126 sends out a request for the reports on fund 1 and fund 2. This request is received by server 128, which in turn constructs a frame set from information obtained from fund information database 130. After the frame sets have been assembled for each fund, the reports (frame sets) 132 and 134 are sent back to the client terminal 126.

Figure 4:
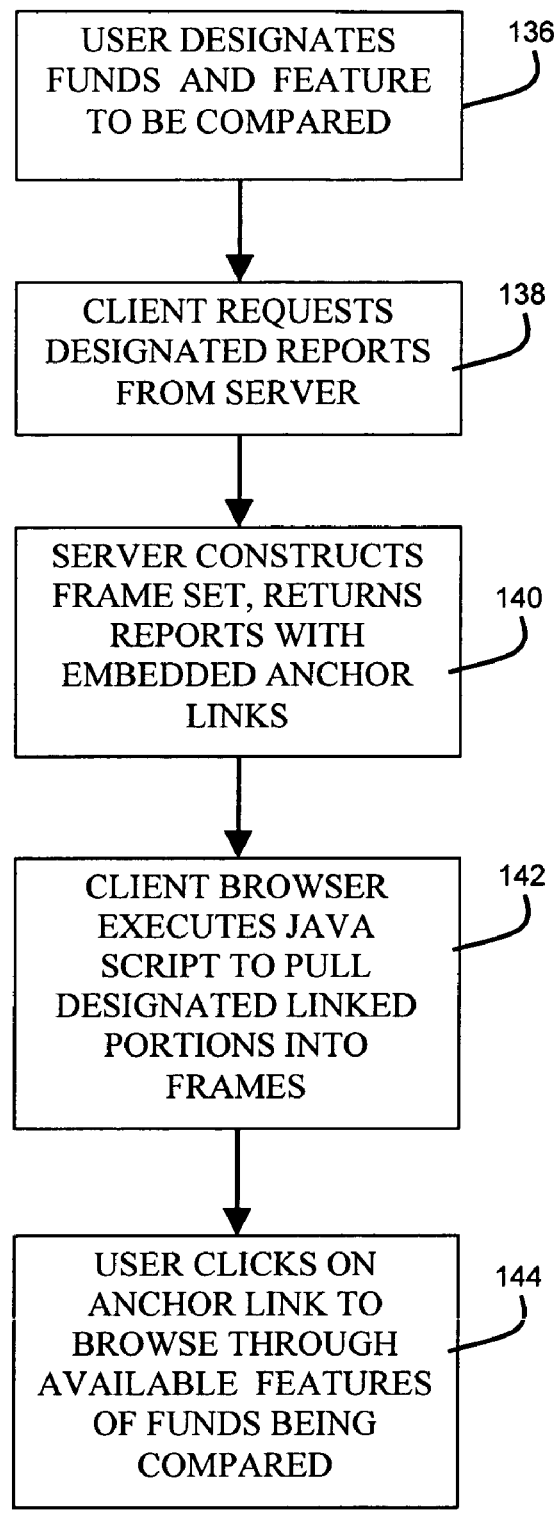
FIG. 4 illustrates the steps involved in the operation of one embodiment of the present invention.

FIG. 4 illustrates the above methodology. In block 136, the user designates funds and the feature to be compared. In step 138 the client terminal request the designated reports from the server 128. In step 140, the server 128 constructs the frame set and returns reports having embedded anchor links. In step 142, the client browser executes a java script to pull designated linked portions into dynamic frames 116 and 118. Finally, in step 144, the user clicks on another anchor link in the navigational frame 114 to browse to another one of the available sections of information of the funds being compared. Because the reports received from the server 128 are set up with anchor links embedded, it is a simple matter to quickly display the requested sections without having to go back to the server 128 for the desired information.

The pertinent code utilized to implement the above functionality in an internet browser, such as the Netscape browser manufactured by NetScape Communications, of Mountain View, Calif., is provided as follows, wherein the lines preceded by double slashes "//" are comments:

//allows you to go to two frames at once
//Javascript counts the frames in order starting with ), in case you're wondering why it's frame 2 and 3 function go(url,where,url2,where2){
   if (where == "_top") parent.top.location.href = url;
   else if (where == "frame2") parent.top.frames[2].location. href = url;
   if (where2 == "_top") parent.top.location.href = url2;
   else if (where2 =="frame3") parent.top.frames[3].location.href = url2;
}

//script to auto load Fund Detail when this file loads, so it won't have to re-load it the
//first time you use the anchor-based navigation javascript:go('/rootMFC09/MFCTmp/MFCTmpFundDetail.morph','frame2', '/rootMFC09/MFCTmp/MFCTmpFundDetail.morph', 'frame3');

//script to call the Fund Detail templates(s) to the local links within the two separate frames <TD VALIGN=top><FONT SIZE="1" FACE="helvetica, arial"><A HREF="javascript:go('/rootMFC09/MFCTmp/MFCTmpFundDetail.morph#

P','frame2','/rootMFC09/MFCTmp/ MFCTmpFundDetail.morph#P','frame3'

)">Performance</A><BR>

<A

HREF="javascript:go('/rootMFC09/MFCTmp/MFCTmpFundDetail.morph#

FC','frame2','/rootMFC09/MFCTmp/ MFCTmpFundDetail.morph#FC','fram e3')">Fund Comparison</A><BR>

<A

HREF="javascript:go('/rootMFC09/MFCTmp/MFCTmpFundDetail.morph#

PQ','frame2','/rootMFC09/MFCTmp/ MFCTmpFundDetail.morph#PQ','fram e3'">Performance Quartile</A><FONT></TD>

As will be readily understood by one skilled in Javascript and HTML programming, the function "go" allows the program to go to two frames, "frames[2]" and "frames[3]", at once. The javascript processes the user input from the navigational frame 114, and provides a response in each of the dynamic frames 116 and 118. The "response" for "frames[2]" is that the frame 116 is navigated to the specified "url"; and the response for "frames[3]" is that the frame 118 is navigated to the specified "url2." The specified "url" and "url2" include the anchor link tag clicked on by the user in navigational frame 114, so that the portion of the reports associated with that anchor link tag are displayed in frames 116 and 118. This is the engine which drives mutliple locations.

In accordance with the function "go," the variables "where" and "where2" are checked to see if they have a value indicating the top frame of the display. If that is the case, then the information displayed is obtained from the location "url" or "url2", respectively.

If, on the other hand, "where" has the value of "frame2", the program assigns to "parent.top.frames[2].location.href", for example, the value of "url" appearing in the argument of the function "go", and displays that information in dynamic frame 116. Likewise, if "where2" has the value of "frame3", the program assigns to "parent.top.frames[3].location.href", for example, the value of "url2" appearing in the argument of the function "go". The terms "frame[2]" and "frame[3]" are entries in a frame array.

The javascript portion beginning with "javascript:go(...)" sets up the communication between the dynamic frames 116 and 118 and avoids another link each time a different anchor link is selected by the user. As indicated by the comments, this script auto loads the reports on the selected items, so that a re-load will not be needed the first time the anchor link based navigation is first used. It is to be noted that the argument has been set up for the "go" function.

The second part of the javascript, beginning with "<TD VALIGN=opt><..." calls the desired portions of the reports into the dynamic frames. Shown in the code reproduced above are calls to three different anchor links: #P, #FC, and #PQ. In the example illustrated which is directed to information on mutual funds, "#P" is the anchor link tag corresponding to "performance" section of the reports; "#FC" corresponds to the "fund comparisons" part of the reports; and "#PQ" corresponds to the "performance quartile" portion of the reports.

Figure 5A:
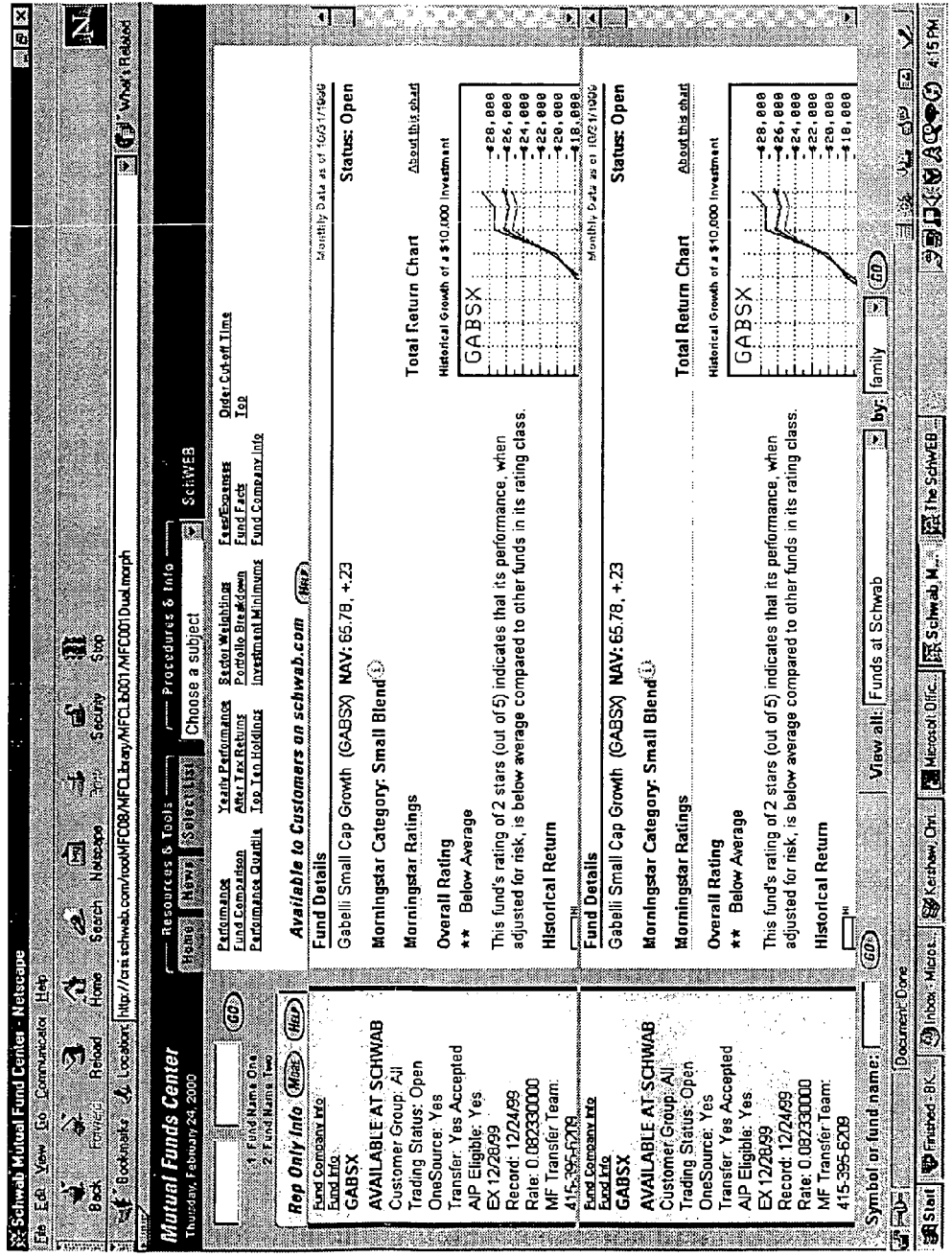
Figure 5B:
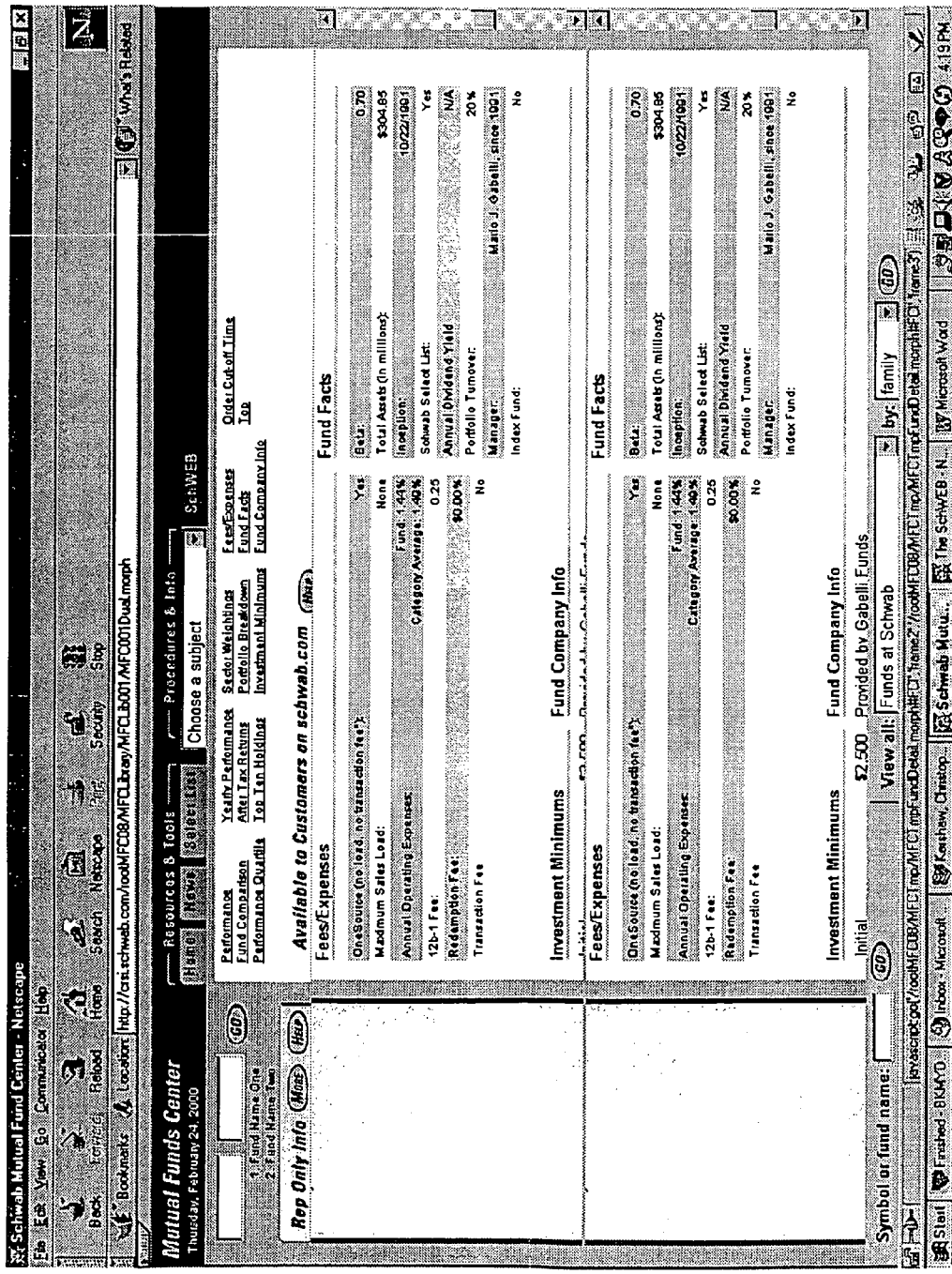
Figure 5C:
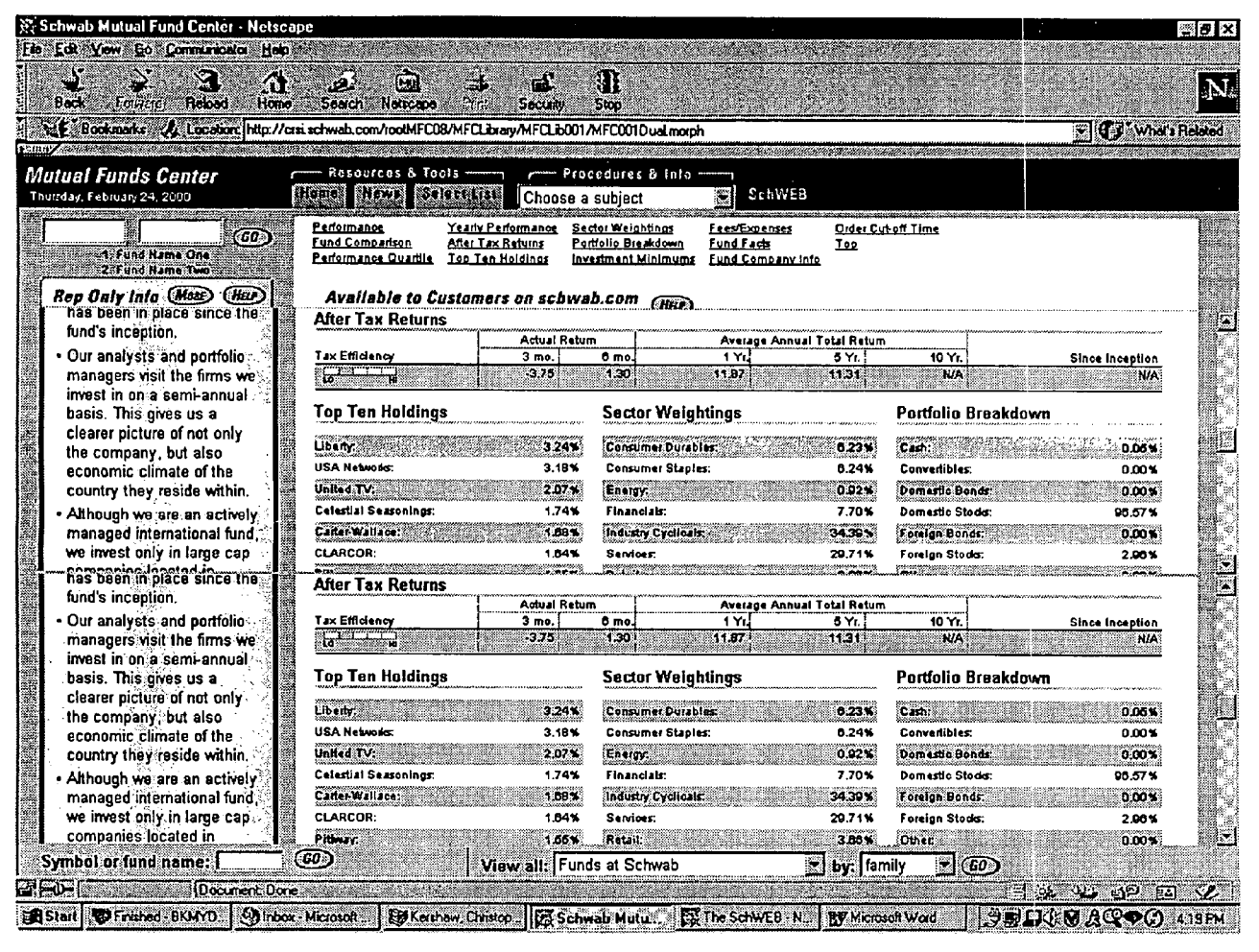

FIGS. 5A, 5B and 5C are screen shots showing an illustrative example of the operation of the present invention. It is to be noted that while in this example the report for the same fund is shown in both dynamic frames, in actual use information for different funds will typically be presented in each dynamic frame. FIG. 5A shows the dynamic frames 116 and 118 displaying the "fund details" portion of the reports for the designated mutual fund GABSX. In practice, GABSX would be entered by the user in box 120, FIG. 1, and the name for a different fund would be entered by the user in box 122. The user would select one of the anchor tags 124, for example "after tax returns," in the navigational frame 114. In response to this selection, the "after tax returns" portion of the reports for the designated funds would be displayed in dynamic frames 116 and 118. See for example, FIG. 5B.

What is claimed is:

1. An apparatus for providing comparative information about a plurality of different items, including a visual display providing a visual image having an interactive navigational frame and a plurality of dynamic frames;

a server communicatively coupled to the visual display and storing information about the plurality of different items, wherein each of the different plurality of items has an associated document that was prepared for the item and that provides information for comparison from that item, and the stored information is in the form of the associated documents;

wherein the server compiles reports in response to a user designation in the navigational frame of the different items to be compared, the reports comprising frames of information about the designated different items in which each frame corresponds to portions of the information relating to common topics and include identifying tags, and wherein the visual display displays in each of the plurality of dynamic frames, in response to a user designation of an identifying tag, the frames from the reports for the different items designated to be compared corresponding to the designated identifying tag, so that the corresponding frames for the different items are observable at the same time.

* * * * *